United States Patent [19]
Kaplan et al.

[11] Patent Number: 5,563,963
[45] Date of Patent: *Oct. 8, 1996

[54] DIGITAL IMAGE NOISE REDUCTION OF LUMINANCE AND CHROMINANCE BASED ON OVERLAPPING PLANAR APPROXIMATION

[75] Inventors: Martin C. Kaplan, Rochester; Heemin Kwon, Pittsford, both of N.Y.

[73] Assignee: Eastman Kodak Company, Rochester, N.Y.

[*] Notice: The term of this patent shall not extend beyond the expiration date of Pat. No. 5,533,149.

[21] Appl. No.: 781,467

[22] Filed: Oct. 23, 1991

Related U.S. Application Data

[63] Continuation of Ser. No. 399,134, Aug. 28, 1989, abandoned.

[51] Int. Cl.[6] .................................................. G06K 9/40
[52] U.S. Cl. ........................... 382/266; 382/275; 358/463
[58] Field of Search .................................. 382/27, 50, 54, 382/205, 254, 266, 275; 358/36, 167, 447, 463; 364/574; 348/607, 612

[56] References Cited

U.S. PATENT DOCUMENTS

| 4,510,618 | 4/1985 | Ataman et al. | 382/54 |
|---|---|---|---|
| 4,520,505 | 5/1985 | Yamamoto et al. | 382/55 |
| 4,731,865 | 3/1988 | Sivenpiper | 382/54 |
| 4,734,770 | 3/1988 | Matsuba | 358/167 |
| 4,794,531 | 12/1988 | Morishita et al. | 364/413.13 |
| 4,817,180 | 3/1989 | Cho et al. | 382/54 |
| 4,827,533 | 5/1989 | Tanaka | 382/54 |
| 4,903,316 | 2/1990 | Hongo et al. | 382/52 |
| 4,941,192 | 7/1990 | Mishima et al. | 382/54 |
| 5,091,972 | 2/1992 | Kwon et al. | 382/54 |

OTHER PUBLICATIONS

Panda et al., "Recursive Least Squares Smoothing of Noise in Images," *IEEE Transactions on Acoustics, Speech, and Signal Proc.*, vol. ASSP-25, No. 6, Dec. 1977, pp. 520–524.

Primary Examiner—Leo Boudreau
Assistant Examiner—Andrew W. Johns
Attorney, Agent, or Firm—Raymond L. Owens

[57] ABSTRACT

The present invention reduces noise in digital photographic images based on the assumption that images may be decomposed into two types of regions, smooth regions and edge regions. Smooth regions are areas of the image lacking any sharp detail, such as blue sky. Edge regions are regions containing sharp detail, such as edges and textured regions (such as grass). The present method reduces noise in the smooth regions by a mathematical blurring technique based on least squares regression. The blurring does not degrade the sharpness of the image, because there are no sharp details in the smooth regions. Edge regions are left undisturbed to maintain sharpness, but the noise is less noticeable in those regions than in the smooth regions. The method operates upon the luminance and chrominance component of a digital image.

29 Claims, 7 Drawing Sheets

DIGITAL IMAGE NOISE REDUCTION OF LUMINANCE AND CHROMINANCE BASED ON OVERLAPPING PLANAR APPROXIMATION

This is a continuation of application Ser. No. 07/399,134, filed Aug. 28, 1989, now abandoned.

CROSS-REFERENCE TO RELATED APPLICATION

The present application is related to U.S. patent application Ser. No. 399,135, filed on even date with the present application and entitled "A Computer Based Digital Image Noise Reduction Method Based on Overlapping Planar Approximation" by M. Kaplan et al. now U.S. Pat. No. 5,533,149, issued Jul. 2, 1996. The related application bears the Assignee's Docket No. 54,891.

TECHNICAL FIELD OF THE INVENTION

The present invention relates to an image data processing method and, more particularly, to a method for reducing noise in digital photographic images based on smoothing, by a blurring technique, the smooth regions of a digital image while maintaining the edge regions undisturbed.

BACKGROUND OF THE INVENTION

To transform a digital image to a finished print of high quality requires that noise components, introduced because of the transformation of the image from an image medium to electrical signals be reduced and/or eliminated such that the noise does not become discernible to the human eye.

One of the methods receiving widespread use in the prior art is related to smoothing the differences between the values of the gray levels of pixels located in neighborhoods. A difficulty associated with this smoothing process is that it not only removes the noise components, but it also blurs the edges. The edges exist when there is a transition region such as a region containing sharp detail, for example, grass which may define or outline a neighboring region which may he either smooth or sharply detailed.

A patent of interest for its teaching of noise reduction in a data processed image is U.S. Pat. No. 4,734,770 entitled "Image Data Processing Method and Device Therefor" by I. Matsuba. The method of that patent treats the first image data set, consisting of a plurality of pixels having values corresponding to their gray level some of which contain noise components, by transforming them into second image data to reduce the noise components appearing in the second image data. The method operates by selecting pixels to be treated and obtaining proposed values (candidate values) which are given to the object pixels based on a stated relationship. A probability function is used to determine whether a pixel in question should be raised to the candidate value or should be maintained at its present value. The probability formula includes the image energy component as one of its terms. A recognition is made for edges of patterns based on energy level comparisons, wherein a high energy level difference between a central and an adjoining pixel would have a high probability of defining an edge.

In the present invention a solution to the edge blurring, when performing the smoothing operation, approaches the problem by determining edge regions and by leaving those regions undisturbed or unoperated upon and by applying a smoothing function to the smooth regions so as to reduce noise in those areas. The method has two responsibilities, one to identify whether a pixel belongs to an edge or to a smooth region and, two, to compute a smoothing code value for the pixel if it belongs to a smooth region. Within this application, these two operations are called "segmentation" and "smoothing," respectively. Both of the aforementioned tasks are accomplished by a least squares fit of a plane to the image, in a neighborhood around the pixel of interest. If the goodness of the fit is small, then in that neighborhood the image is well approximated by a plane, and thus must be a smooth region. Further, the fit provides a smooth estimate for the code value at the pixel of interest which is the value of the fitted plane at the pixel of interest.

SUMMARY OF THE INVENTION

The present invention method reduces noise (graininess) in digital photographic images by operating on the luminance component of an image and the chrominance components. Generally speaking, this is accomplished by a mathematical generalization from a scalar field to a vector field, with special consideration being given to the characteristics of the human visual system.

One preferred method of the present invention for reducing digital image noise is comprised of the steps of forming a signal matrix of pixel values for each primary color of an original image; determining if a pixel belongs to an edge region and if not, computing a smoothing code value from the pixel so as to reduce image noise.

To determine if a pixel of interest belongs to an edge region a neighborhood is selected around the pixel and a least squares fit is performed to provide a goodness of fit factor. Next, another least squares fitting plane operation is performed using a matrix to provide an estimated value of the pixel of interest. The above is continued for all neighborhoods around the pixel. All of the estimated values are combined with weights based on the goodness of fit to provide a pixel value. The operation is continued for all pixels in the original image and the pixel values derived therefrom are used to form an output image with reduced digital noise.

The image is a mathematical field because it is a function of spatial variables, namely the x and y coordinates of the pixel position in the image. The luminance image is a scalar field, because it is a function having a single value (luminance) at each spatial position (pixel). The full 3-color image (luminance and chrominance) is a vector field, because it has 3 values (red, green, blue) at each spatial position. To provide a mathematical generalization from a scalar field to a vector field, the scalar equations need to be rewritten in the proper form for a vector field.

From the foregoing, it can be seen that it is a primary object of the present invention to provide an improved method for removing noise components from the luminance and chrominance of digital image signals without degrading edge values.

It is a further object of the present invention to provide an improved smoothing of the pixel values of a digital image in smooth regions while not disturbing edge regions.

It is an additional object of the present invention to provide a method for reducing noise in the smooth regions of a digital image by a blurring technique based on a least squares regression applied to luminance and chrominance signals.

These and other objects of the present invention will become more apparent from the following description when taken in conjunction with the attached drawings wherein like characters indicate like parts and which drawings form a part of the present description.

DESCRIPTION OF THE PREFERRED EMBODIMENT

Figure 1:
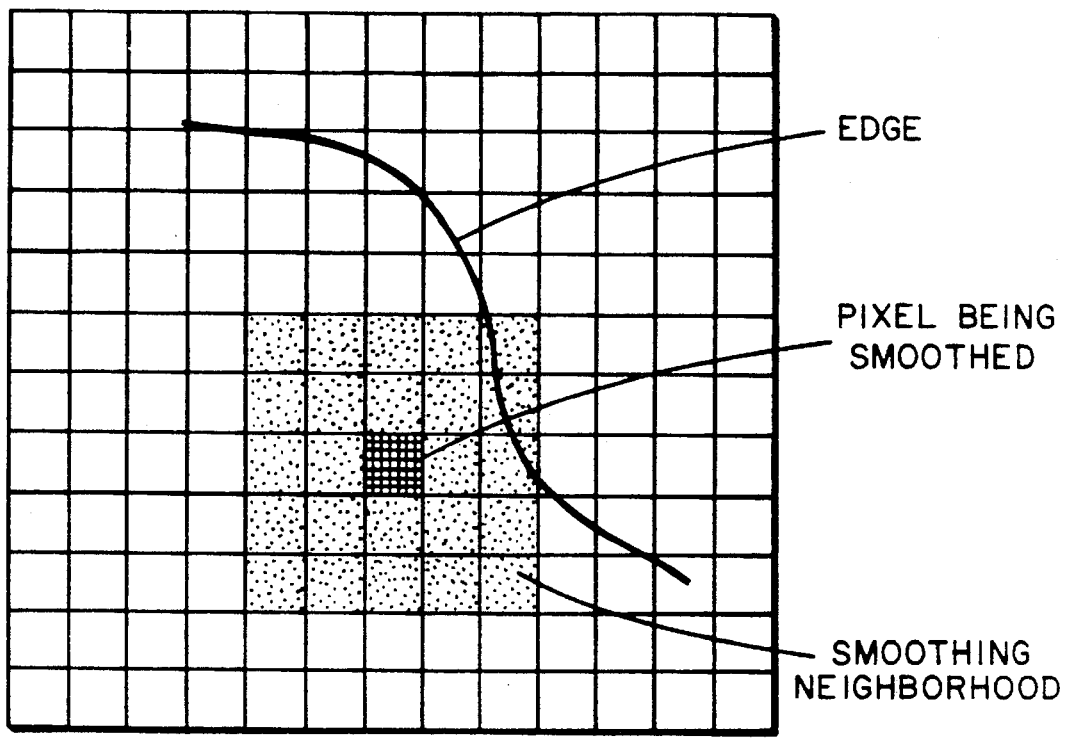
FIG. 1 is a line diagram illustrating the smoothing of a near edge pixel by a convolution technique.

As previously mentioned, the method of the present invention has two major chores. One is to identify whether a target pixel belongs to an edge or a smooth region and the other is to compute a smoothed code value for the pixel if it belongs to the smooth region. The smoothing process can be done by convolution with a smoothing kernel, as is common practice in digital signal processing. But doing the smoothing by least squares provides an advantage. Referring to FIG. 1, wherein the smoothing of a pixel by a convolution is shown requiring the kernel "neighborhood" to be symmetric and centered on the target pixel, to provide an unbiased estimate for the smoothed target pixel. When the target pixel approaches an edge, the neighborhood surrounding the target pixel will project pixel members onto and past the edge surface. A least squares method has no such requirement.

Let $N_{kl,\alpha}$ be a neighborhood of type $\alpha$, centered at pixel location (k,l).

Let the 3-component vector $\vec{Z}_{ij}$ be the color values (red, green, blue vector) and $\Sigma_{ij}$ be the 3×3 noise covariance matrix at pixel (i,j).

Let $X_{kl,\alpha}^2$ be the goodness of fit for the linear least squares regression of a hyper-plane on the neighborhood $N_{kl,\alpha}$ and let $\vec{Z}_{ij}^{kl,\alpha}$ be the estimate of the regression at pixel location (i,j), where pixel (i, j) is some pixel in the neighborhood $N_{kl,\alpha}$. A multi-variate linear least squares regression (which is a standard mathematical technique) of a hyper-plane finds the vector coefficients $\vec{a}, \vec{b}, \vec{c}$ which minimize the fitting error $X_{kl,\alpha}^2$ defined by:

$$\chi_{kl,\alpha}^2 = \quad (1)$$

$$\sum_{(i,j) \in N_{kl,\alpha}} [\vec{z}_{ij} - (\vec{a}_{kl} + \vec{b}_{kl}i + \vec{c}_{kl}j)]^\dagger \Sigma_{ij}^{-1} [\vec{z}_{ij} - (\vec{a}_{kl} + \vec{b}_{kl}i + \vec{c}_{kl}j)]$$

and the estimated code value at pixel (i,j) is:

$$\vec{z}_{ij}^{kl,\alpha} = \vec{a}_{kl} + \vec{b}_{kl}i + \vec{c}_{kl}j \quad (2)$$

Compute the noise reduced code value at pixel (i,j) as:

$$\vec{z}_{ij}' = \frac{\sum_{kl,\alpha} \omega(\alpha, \chi_{kl,\alpha}^2) \vec{z}_{ij}^{kl,\alpha}}{\sum_{kl,\alpha} \omega(\alpha, \chi_{kl,\alpha}^2)} \quad (3)$$

where the sums are all $kl,\alpha$ such that pixel $(i,j) \in N_{kl,\alpha}$.

Apply the weighting function, $$\omega(\alpha, \chi_{kl,\alpha}^2) = \frac{W_\alpha}{n_\alpha} e^{-\frac{\chi_{kl,\alpha}^2}{v_\alpha} r_\alpha} \quad (4)$$

where $W_\alpha$ is an empirically chosen weight for each neighborhood type, $n_\alpha$ is the number of pixels in the neighborhoods $v_\alpha$ is the degrees of freedom for the least squares fit (which is the number of pixels in the neighborhood $\alpha$ minuses 9, because the vector coefficients $\vec{a}, \vec{b}, \vec{c}$ have a total of 9 components) and $r_\alpha$ is an empirically chosen rolloff parameter.

To further generalize the method, equations 1–4 are rewritten. Two least squares fits must be performed, once for segmentation and again for smoothing, so we must minimize two $X^2$'s.

$$\chi_{Ekl,\alpha}^2 = \quad (5)$$

$$\sum_{(i,j) \in N_{kl,\alpha}} [\vec{z}_{ij} - (\vec{a}_{kl}^E + \vec{b}_{kl}^E i + \vec{c}_{kl}^E j)]^\dagger M_{ij}^E [\vec{z}_{ij} - (\vec{a}_{kl}^E + \vec{b}_{kl}^E i + \vec{c}_{kl}^E j)]$$

$$\chi_{Hkl,\alpha}^2 = \quad (6)$$

$$\sum_{(i,j) \in N_{kl,\alpha}} [\vec{z}_{ij} - (\vec{a}_{kl}^H + \vec{b}_{kl}^H i + \vec{c}_{kl}^H j)]^\dagger M_{ij}^H [\vec{z}_{ij} - (\vec{a}_{kl}^H + \vec{b}_{kl}^H i + \vec{c}_{kl}^H j)]$$

where the matrices $M_{ij}^E$, $M_{ij}^H$ are related to the noise covariance matrix as explained later. (Note: in the notation, E stands for "edge," and H stands for "human visual system," representing the segmentation and smoothing steps, respectively.) The weights are computed based on the segmentation fit, $$\omega(\alpha, \chi_{Ekl,\alpha}^2) = \frac{W_\alpha}{n_\alpha} e^{-\frac{\chi_{Ekl,\alpha}^2}{v_\alpha} r_\alpha} \quad (7)$$

and the least squares estimated code values are based on the smoothing fit, $$\vec{z}_{ij}^{kl,\alpha} = \vec{a}_{kl}^H + \vec{b}_{kl}^H i + \vec{c}_{kl}^H j \quad (8)$$

The final result is the noise-reduced image code value, $$\vec{z}_{ij}' = \frac{\sum_{kl,\alpha} \omega(\alpha, \chi_{Ekl,\alpha}^2) \vec{z}_{ij}^{kl,\alpha}}{\sum_{kl,\alpha} \omega(\alpha, \chi_{Ekl,\alpha}^2)} \quad (9)$$

The most likely application of this further generalization would be to define the two weighting matrices as follows:

$$M_{ij}{}^E = (U_E{}^\dagger D_E U_E)^\dagger \Sigma_{ij}{}^{-1}(U_E{}^\dagger D_E U_E) \quad (10)$$

$$M_{ij}{}^H = (U_H{}^\dagger D_H U_H)^\dagger \Sigma_{ij}{}^{-1}(U_H{}^\dagger D_H U_H) \quad (11)$$

where $U_E, U_H$ are unitary matrices, $D_E, D_H$ are diagonal matrices, and $\Sigma_{ij}$ is the noise covariance matrix. The unitary matrices $U_E, U_H$ perform a rotation in vector space, and the diagonal matrices $D_E, D_H$ provide different weights along the different axes in the rotated vector space. Thus, a likely choice would be to select a $U_H$ which rotates into a luminance type space (placing one vector space axis along luminance Y, and another vector space axis along the more important of the two chrominance directions), and $D_H$ which weights the luminance most heavily, and weights the less important of the two chrominance components least. $U_E, D_E$ are selected to rotate into a space which is good for locating edges, with appropriate weights, which may be a luminance space, a principal components space, or some other space. Note that in a principal component space, by definition U diagonalizes the covariance matrix $\Sigma_{ij}$, which simplifies the computation. Also, if $U_E, D_E$ are chosen identical to $U_H, D_H$, then equations 5 and 6 become identical and the computational burden is reduced. If $D_E, D_H$ are both the identity matrix, then equations 5–10 reduce back to equations 1–4, regardless of the values of $U_E, U_H$. Thus, rotating the vector space accomplishes nothing, unless the different axes are weighted differently.

Figure 2:
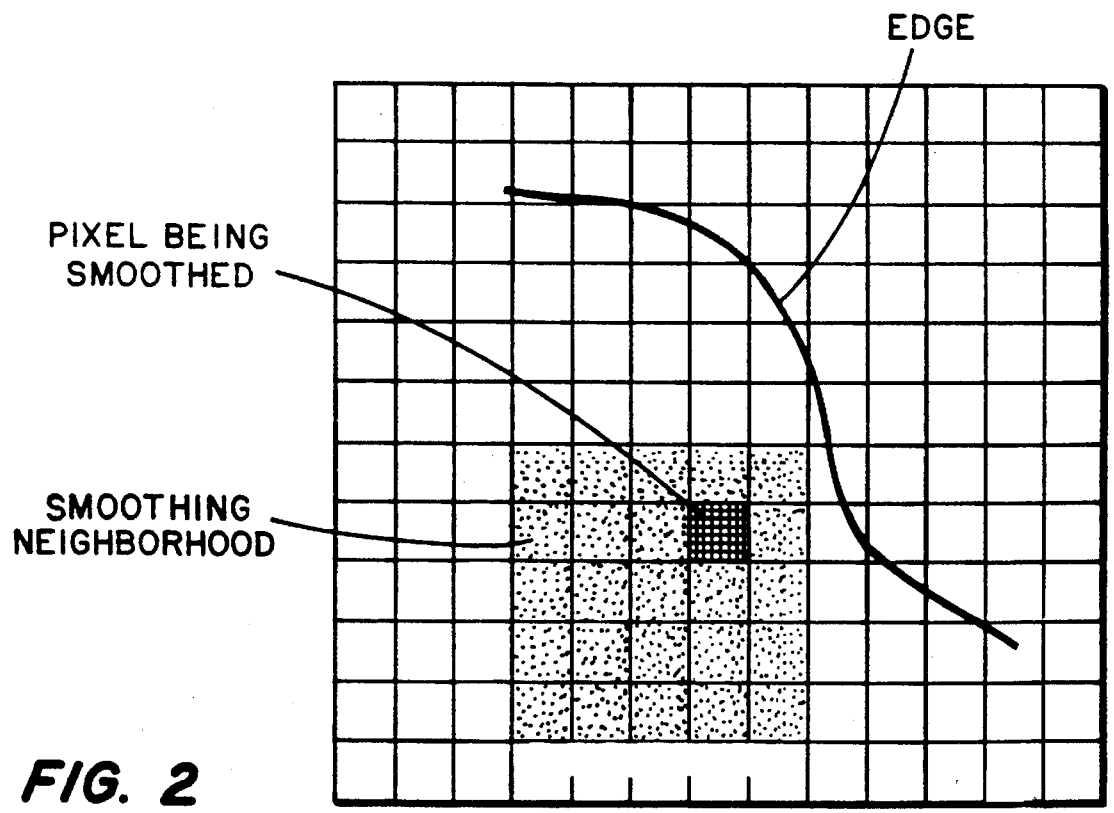
FIG. 2 is a line diagram illustrating the smoothing of a near edge pixel by a least squares technique.

FIG. 2 illustrates the advantage of utilizing a least squares technique. The target pixel can be located with an off-center neighborhood, thereby permitting the target pixel to approach closer to an edge region. As FIG. 1 shows, a convolution smoothing tends to blur edges, because they "leak" into neighboring pixels. A least squares method can avoid blurring edges by choosing neighborhoods which avoid the edges.

Figure 3:
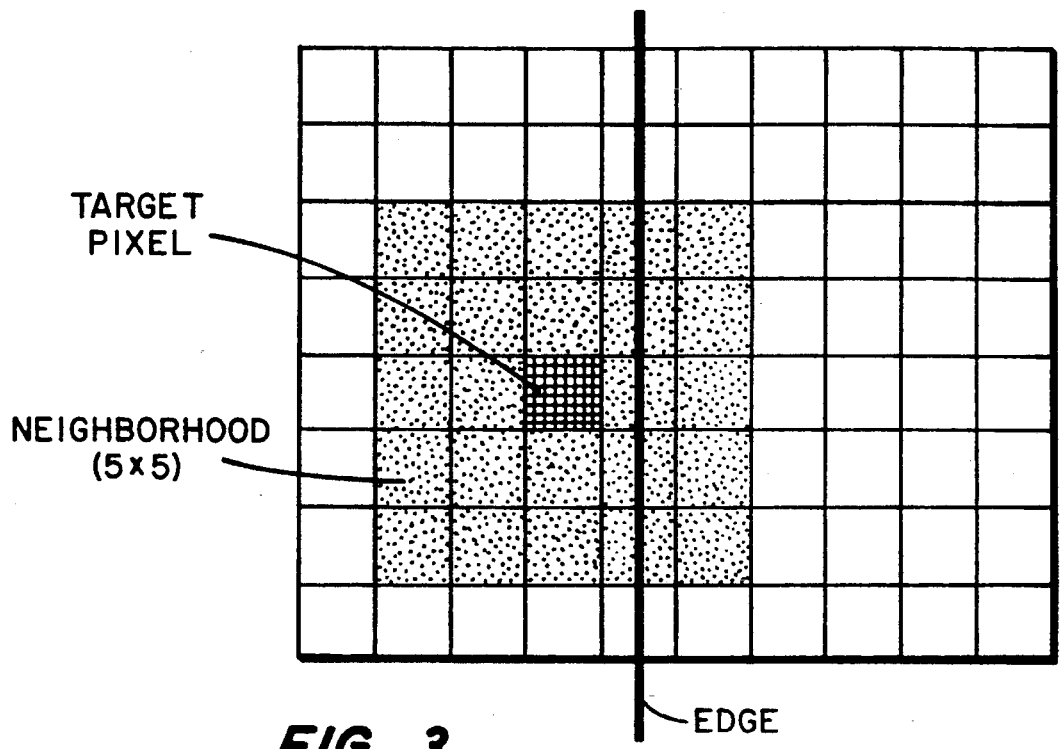
FIG. 3 illustrates a square neighborhood of pixel elements with the target pixel being near an edge.
Figure 4:
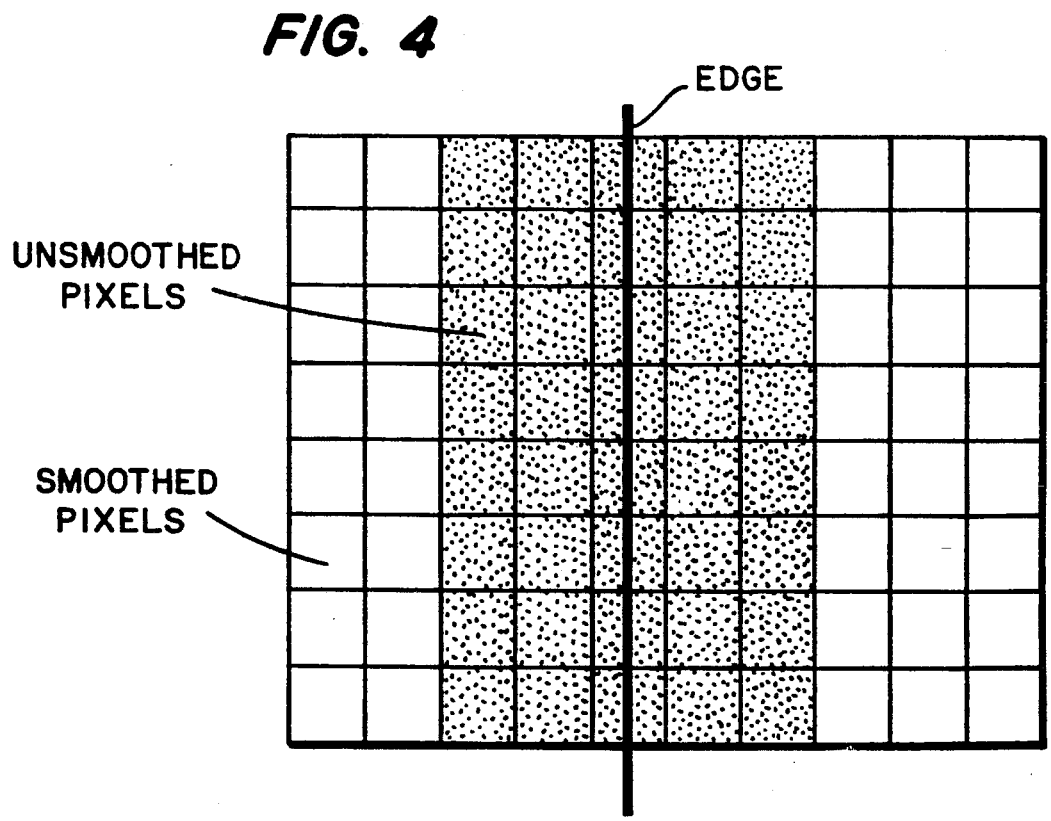
FIG. 4 illustrates a matrix of pixels with the smoothed pixels being distanced from an edge on both sides so as to create a channel of unsmoothed pixels surrounding each edge.
Figure 5:
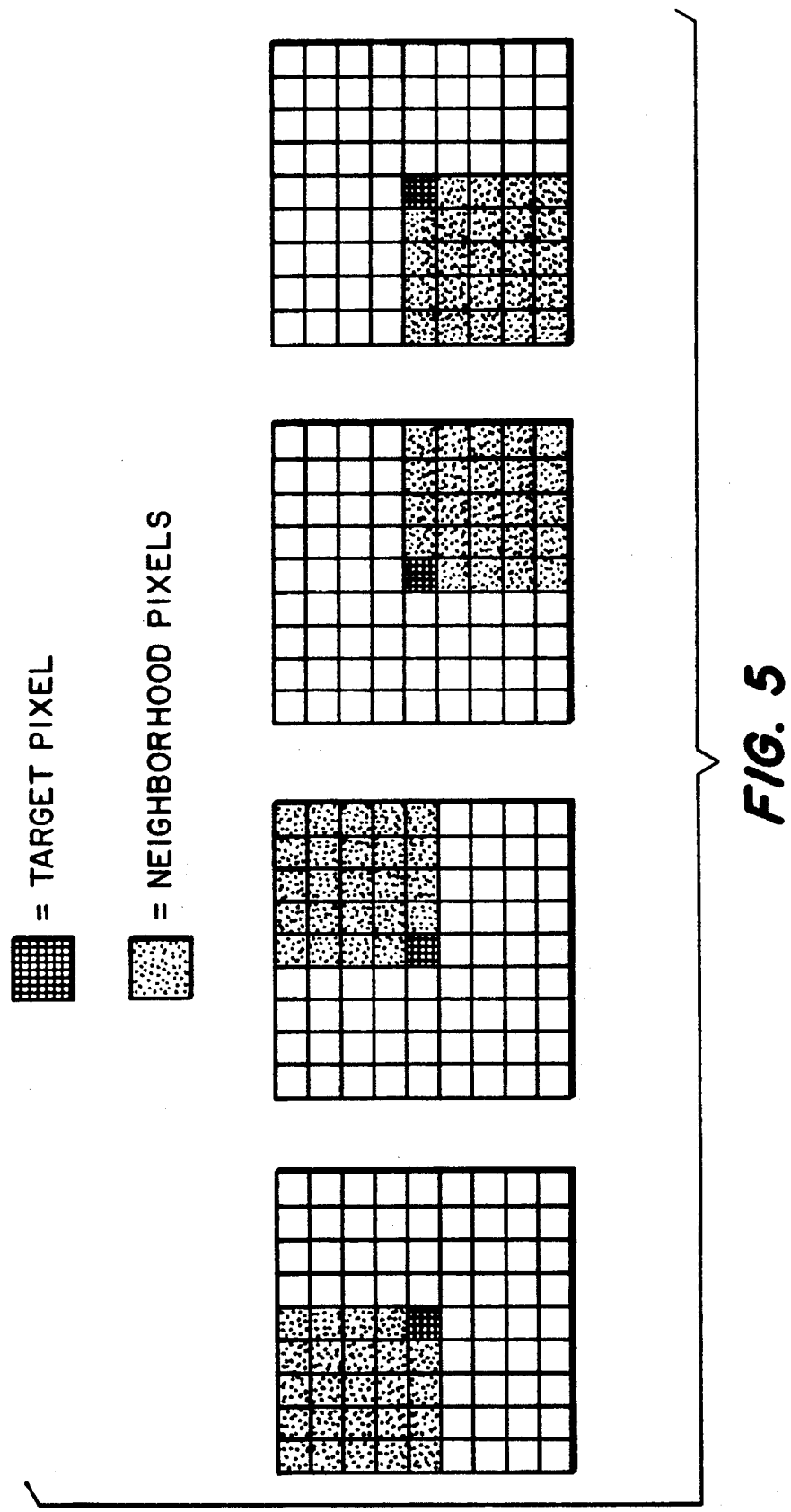
FIG. 5 illustrates four different blocks of (5×5) neighboring pixels about one target pixel (four quadrant neighborhoods).

Referring to FIG. 3, an algorithm based on the above takes a 5×5 neighborhood centered on each target pixel and performs a least squares fit and, if the value $X^2$ ($X^2$ is a sum of squared errors normalized for the standard deviation at each pixel) is below a threshold value, the algorithm replaces the target pixel's code value by the least squares estimate. This approach is acceptable in the interior of a smooth region but fails for target pixels which are near the border of a smooth region. This failure is caused by the 5×5 neighborhood overlapping the edge or border of the smooth region, which in turn results in a large $X^2$ that exceeds the threshold value and therefore the pixel of interest is not replaced with the pixel code value or in other words is not smoothed. The result of continuing that process around an edge is shown in FIG. 4 such that a channel or roadway of unsmoothed pixels around an edge line will result.

An improvement is achieved by considering several neighborhoods for each target pixel and selecting one of the neighborhoods which results in the most preferred fit. For example, FIGS. 5A through 5D illustrate a target pixel being a corner pixel for four 5×5 neighborhoods. These neighborhoods can be called quadrant neighborhoods and are used to determine the value of $X^2$ which has the smallest value. This value can then be compared against the threshold value to determine if the pixel value should be replaced with a code value. If none of the neighborhood values is below the threshold then it is assumed that the pixel is truly an edge pixel and a smoothing is not applied to it. If at least one neighborhood value is below the threshold, then the neighborhood with the lowest value is used to compute the smoothed value.

Figure 6:
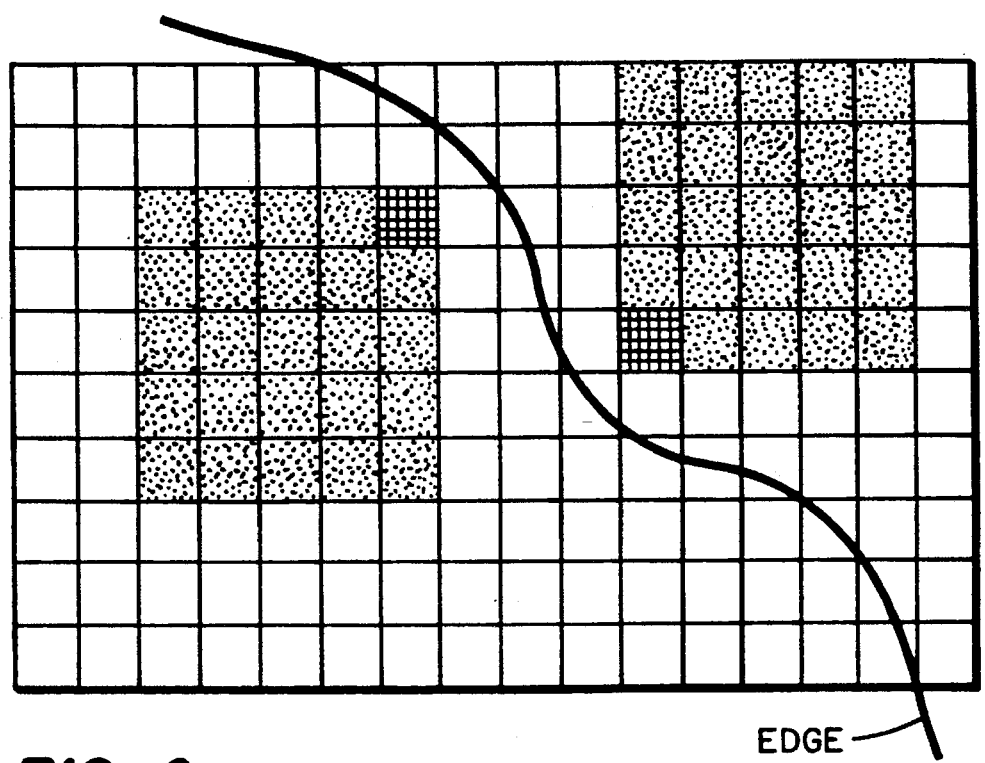
FIG. 6 illustrates a matrix of pixel elements representing selected neighborhoods for two target pixels on opposite sides of an edge.

In FIG. 6, the selected target pixel neighborhoods, for two target pixels, are shown positioned on opposite sides of an edge. The result of this is that for pixels near an edge, the pixels will be smoothed by incorporating them into neighborhoods entirely on the correct side of the edge. This method provides proper noise reduction right up to the edges (as opposed to leaving bands of noise surrounding the edges), but it also produces an artifact which makes the picture look "blocky". The artifact is caused because the algorithm has a tendency to use one type of quadrant neighborhood "such as the upper left" for several adjacent target pixels, and then to switch to another type of quadrant neighborhood (such as a lower right) for the next several target pixels, and so on.

To eliminate the "blocky" look, all of the neighborhoods containing the target pixel were used. For 5×5 neighborhoods, for each target pixel there are 25 neighborhoods containing the target pixel. This is intended to provide a more continuous behavior, to reduce blocking, because of the larger number of neighborhoods used.

Figure 7:
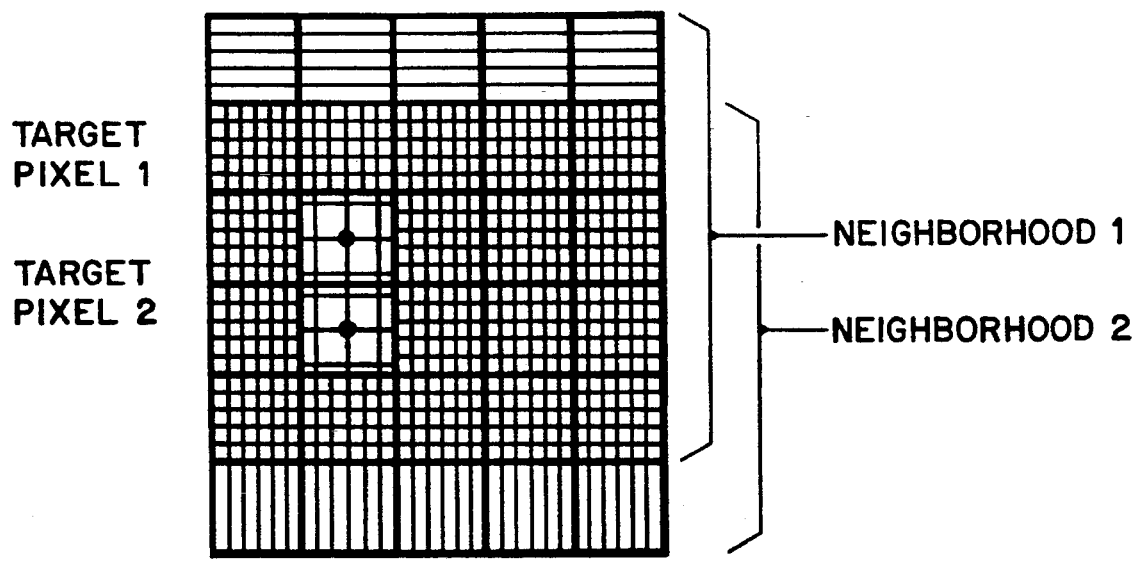
FIG. 7 represents an overlapping of corresponding neighborhoods for two adjacent target pixels.

Unfortunately, the "blocking" persists even after using all neighborhoods. This was attributed to the fact that for two adjacent target pixels, there are two sets of 25 neighborhoods (one set for each target pixel), and each neighborhood in one set contains mostly the same pixels as several neighborhoods in the other set (for example see FIG. 7). Thus the two sets of least squares fits produce similar results, and when the algorithm selects the neighborhood with the lowest $X^2$ for each target pixel, it tends to pick nearly identical neighborhoods from each of the two sets of neighborhoods. As the algorithm scans the picture selecting new target pixels, it continues to select similar neighborhoods. Occasionally the selection of neighborhoods flips to a radically different choice, and then this new selection persists over may target pixels. A noticeable blocking artifact is produced where the selection flips. This is basically the same blocking artifact as described above for quadrant neighborhoods.

Since the blocking artifact appears to be caused by the instability in the selection of the single best neighborhood for each target pixel, the algorithm was modified to avoid the need to make a selection. Instead of selecting one neighborhood, the algorithm uses all neighborhoods of a target pixel, weighting them according to "goodness," applying large weight for small $X^2$ (good fits) and small weight for large $X^2$ (poor fits). This eliminates the blocking artifact.

The weighting function $w(\alpha, X^2)$ (equation 4) was originally based on the $X^2$ probability distribution, which is statistically appropriate when the model surface (a plane) correctly describes the data surface (image), with the fitting error $X^2$ resulting only from noise and errors in choosing the fitting parameters. However, analysis showed that the fitting errors $X^2$ were statistically distributed very differently from the $X^2$ distribution, even in the smooth regions. This indicates that the model surface (plane) is not an adequate description of the data surface (image). This is not surprising, since the data surface has a very curved and irregular shape, even within the smooth regions. To deal with this difficulty, the ad hoc weighting function of equation 4 was substituted for the original $X^2$ distribution based weighting function.

Neighborhood size selection is a remaining factor. The larger the neighborhood, the larger the noise reduction, because many pixels contribute to the smoothing. However, a large neighborhood size is unable to deal with details in the picture smaller than the neighborhood size. This is because for small details there is no neighborhood which fits entirely within the detail, and thus the algorithm considers the detail to be an edge region, and provides no smoothing. This difficulty is dealt with by using neighborhoods of several sizes. The algorithm weights different sized neighborhoods differently, with the result being that large smooth regions of the picture are smoothed primarily by large neighborhoods. Smaller smooth regions are smoothed primarily by smaller neighborhoods, because the large neighborhoods don't fit within the region, thus have large $X^2$ and small weight.

Finally, it should be noted that the algorithm includes neighborhoods of size 1×1. Although this can be mathematically described simply as 1×1 neighborhoods, the intent and result are somewhat different than for larger neighborhoods—the 1×1 neighborhoods provide the mechanism by which edge regions are permitted to remain unsmoothed. In an edge region, all neighborhoods larger than 1×1 yield large $X^2$ when the least squares fit is performed. Strictly speaking, it is not possible to fit a 1×1 neighborhood with a plane, because there is only one 3-component data point and nine fitting parameters (making the fit mathematically underdetermined). Instead, a perfect fit is assumed (i.e. the fit estimate of the code value at the single pixel is exactly equal to the original code value, and $X^2=0$). The result is that in edge regions, only the 1×1 neighborhoods have small $X^2$ and are heavily weighted, and they pass the original picture information unsmoothed.

Figure 8A:
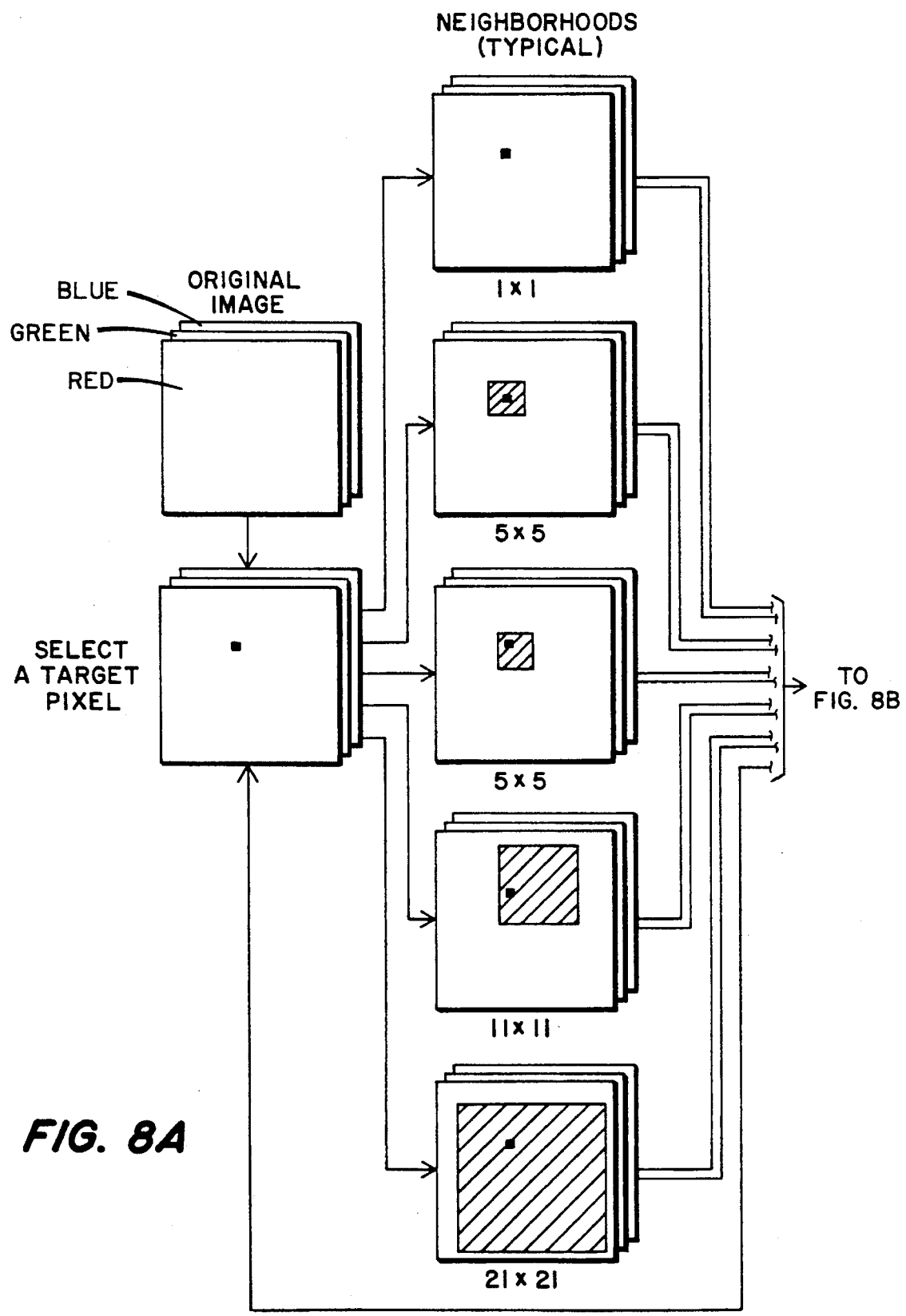
FIGS. 8A and 8B illustrate a flow chart depicting the method steps of the present invention.
Figure 8B:
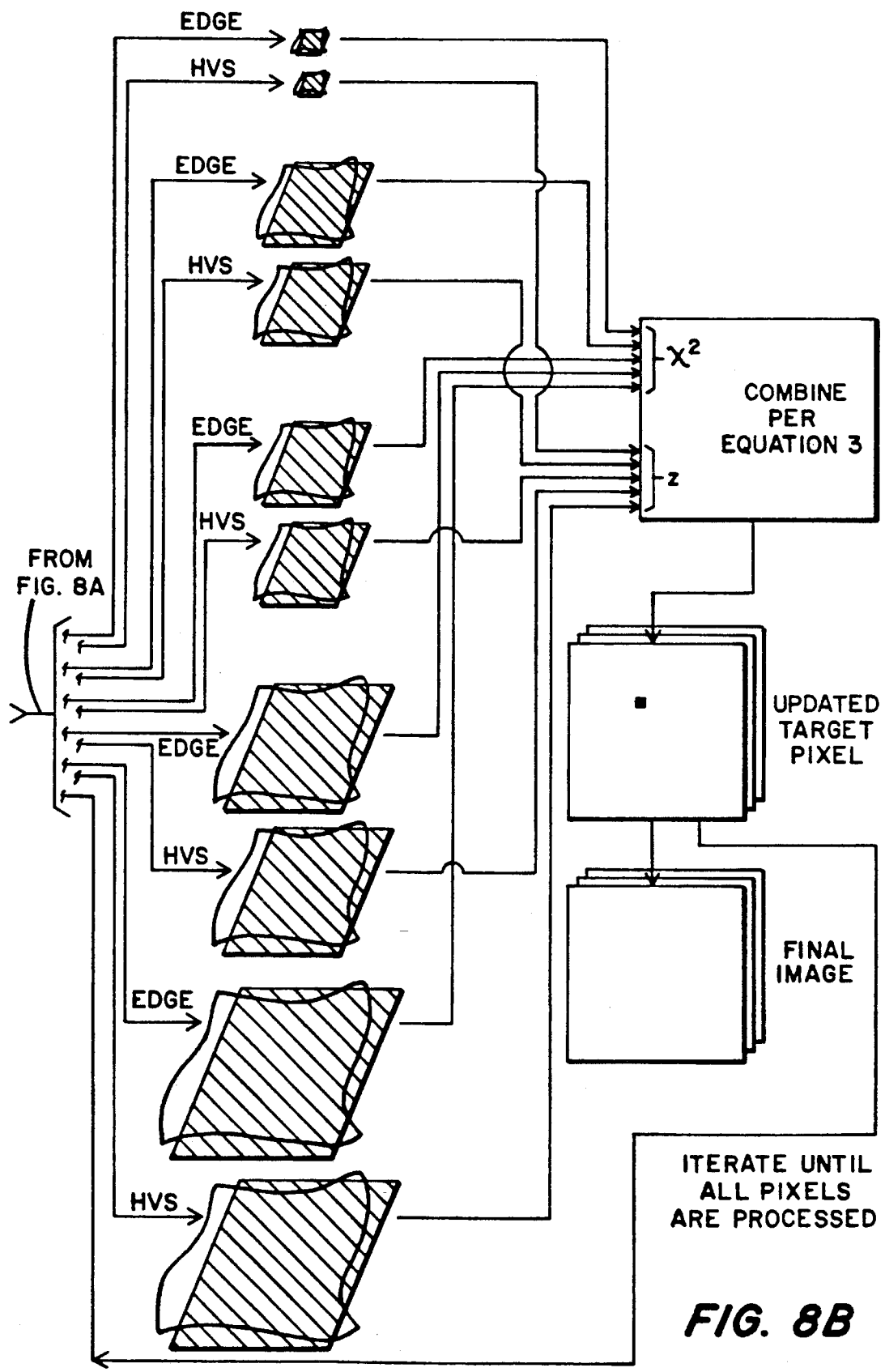
Figure 9:
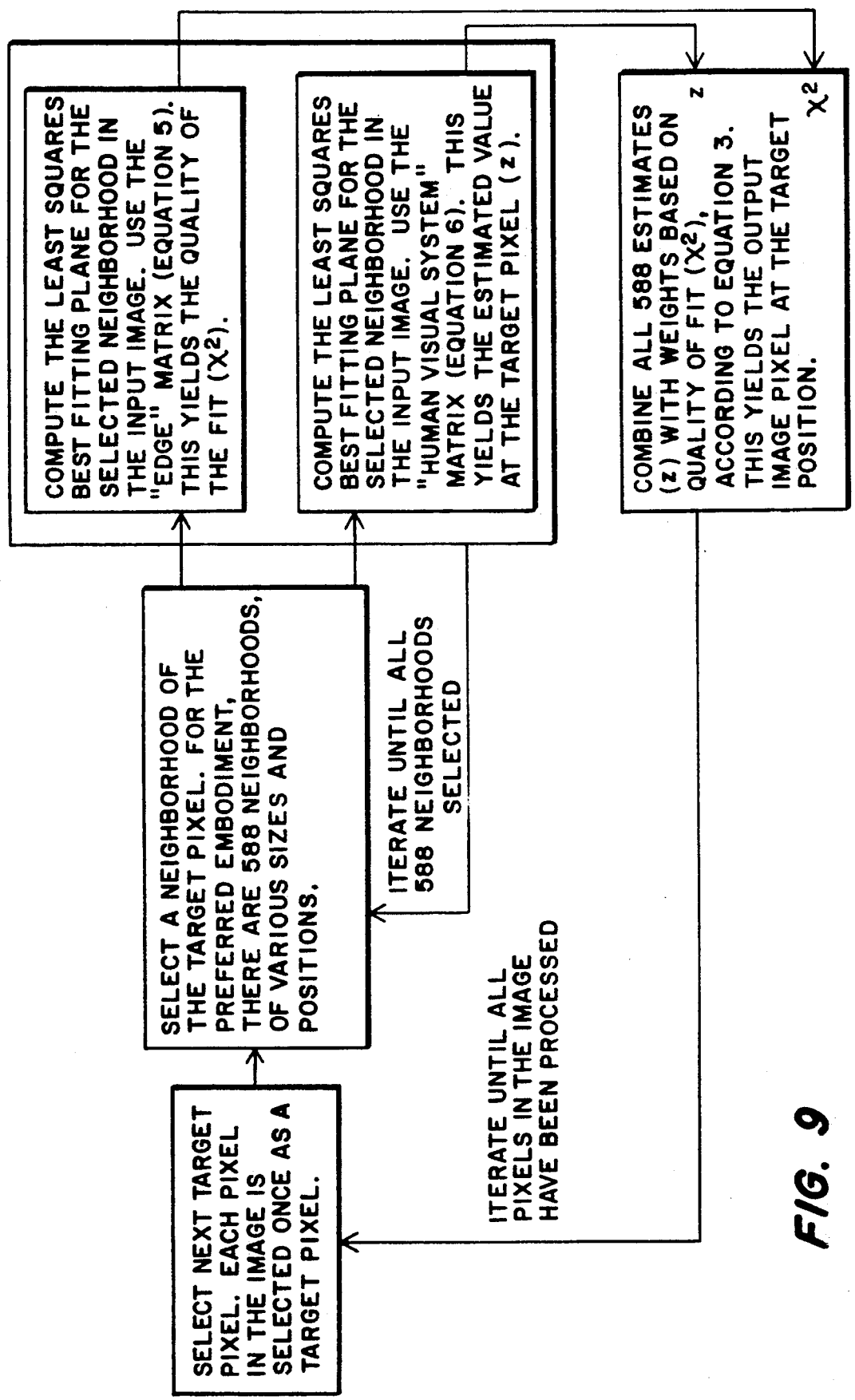
FIG. 9 is a verbal flow chart verbally depicting the method steps of the flow chart of FIGS. 8A and 8B.

Referring now to FIGS. 8A, 8B and 9 in conjunction, from a multi-band original digital image (Blue, Green and Red) a target pixel is selected. For each target pixel, a neighborhood is selected. The total number of neighborhoods for the preferred embodiment is 588. For each neighborhood selection the least squares best fitting plane is computed using the "Edge" matrix (equation 5) to yield the quality of fit $X^2$. Additionally, for each neighborhood selection the least squares best fitting plan is computed using the "Human Visual System" matrix (equation 6) to yield the estimated value (z) at the target pixel. The process is iterated for all 588 selected neighborhoods. All 588 estimates (z) are combined with weights based on the quality of fit ($X^2$), according to equation 3 to yield the output image pixel value at the target position. This process is iterated until all pixels in the original image have been processed.

This approach generalizes the approach of U.S. patent application Ser. No. 07/349,135 as follows.

First, a full noise covariance matrix ($\Sigma_{ij}$) is used, and thus it takes into account correlations of the noise in the different channels. Second, the weights $w(\alpha,X^2)$ are computed for all 3 channels together, not independently, and the same weight is used in each of the 3 channels. Computing the weights by combining the channels enhances the ability to recognize edges and textures. Third, it takes into consideration the human visual system.

It is desirable to further generalize the equations, to take into consideration the characteristics of the human visual system. The present method is a two step method. First, it segments the image by computing the weights (equations 5,7). Second, it smooths the image code values (equations 6,8,9). There is a significant difference between these two steps that must be considered. The smoothing step computes new image code values, which will be directly observed by the human eye, so special attention is paid to the luminance channel because of its greater significance to the human visual system.

On the other hand, the segmentation step represents an effort to locate edges and textures in the image, and does not compute new image code values, and thus luminance is less relevant in the segmentation step. If luminance is significant in the segmentation step, it is for a more subtle reason. The human visual system has evolved into a highly efficient system for understanding the visual world, and thus perhaps its emphasis on the luminance channel is a commentary that when trying to understand a scene, luminance is given extra consideration.

While there has been shown what is considered to be the preferred embodiment of the invention, it will be manifest that many changes and modifications may be made therein without departing from the essential spirit of the invention. It is intended, therefore, in the annexed claims, to cover all such changes and modifications that may fall within the true scope of the invention.

We claim:

1. An overlapping planar approximation method for reducing digital image noise in multi-band digital images comprising the steps of:

(a) selecting a target pixel (which is a vector with a number of components equal to the number of bands in the image) from a set of pixels representing an image of interest;

(b) selecting a neighborhood of the target pixel;

(c) computing a least squares best fit plane of pixel vectors for the selected neighborhood of step b to provide a goodness of fit ($X^2$) and an estimated vector value of the target pixel;

(d) iterating steps b and c for various types (sizes) and positions of neighborhoods of the target pixel;

(e) summing all estimated values of the target pixel with weights based on the goodness of fit ($X^2$) to provide an output image pixel for the target position; and (f) iterating steps a through e for all pixels from the image of interest, so as to form a set of reduced noise image pixels.

2. The overlapping planar approximation method, according to claim 1, wherein the goodness of fit of step c is defined as:

$$\chi^2_{kl,\alpha} = \qquad (1)$$

$$\sum_{(i,j)\in N_{kl,\alpha}} [\vec{z}_{ij} - (\vec{a}_{kl} + \vec{b}_{kl}i + \vec{c}_{kl}j)]^\dagger \sum_{ij}^{-1} [\vec{z}_{ij} - (\vec{a}_{kl} + \vec{b}_{kl}i + \vec{c}_{kl}j)]$$

and the estimated code value vector of a target pixel positioned at (i,j) is:

$$\vec{z}_{ij}^{kl,\alpha} = \vec{a}_{kl} + \vec{b}_{kl}i + \vec{c}_{kl}j \qquad (2)$$

and the computed noise reduced code value vector of the target pixel at position (i,j) is:

$$\vec{z}_{ij}' = \frac{\sum\limits_{kl,\alpha} \omega(\alpha, \chi^2_{kl,\alpha}) \vec{z}_{ij}^{kl,\alpha}}{\sum\limits_{kl,\alpha} \omega(\alpha, \chi^2_{kl,\alpha})} \qquad (3)$$

where the sums are over all kl,α such that pixel $(i,j) \in N_{kl,\alpha}$ and where the weighting function is:

$$\omega(\alpha, \chi^2_{kl,\alpha}) = \frac{W_\alpha}{n_\alpha} e^{-\frac{\chi^2_{kl,\alpha}}{\nu_\alpha} r_\alpha} \qquad (4)$$

wherein $N_{kl,\alpha}$ is a neighborhood of type α centered at pixel (k,l), $W_\alpha$ is an empirically chosen weight for each neighborhood type, $n_\alpha$ is the number of pixels in the neighborhood, $\nu_\alpha$ is the degrees of freedom for the lease squares fit, $r_\alpha$ is an empirically chosen rolloff parameter of order unity, $\vec{z}_{ij}$ is a code value vector (having one component per band of the multi-band image), $\Sigma_{ij}$ is the noise covariance matrix at pixel (i,j), $\chi^2_{kl,\alpha}$ is the goodness of fit for the linear least squares regression of a plane on neighborhood $N_{kl,\alpha}$, and $\vec{z}_{ij}^{kl,\alpha}$ is the estimate of the regression at pixel location (i,j), where pixel (i,j) is some pixel in the neighborhood $N_{kl,\alpha}$, and a,b,c are coefficients which minimize the goodness of fit.

3. The overlapping planar approximation method, according to claim 2, for the case of the noise covariance matrix $\Sigma_{ij}$ being diagonal to thereby partially decouple the equations for the various bands.

4. The overlapping planar approximation method, according to claim 2, wherein two least squares fits are substituted in place of the single least squares fit by replacing equations 1 through 4 by the following equations:

$$\chi^2_{Ekl,\alpha} = \qquad (5)$$

$$\sum_{(i,j) \in N_{kl,\alpha}} [\vec{z}_{ij} - (\vec{a}_{kl}^E + \vec{b}_{kl}^E i + \vec{c}_{kl}^E j)]^\dagger M_{ij}^E [\vec{z}_{ij} - (\vec{a}_{kl}^E + \vec{b}_{kl}^E i + \vec{c}_{kl}^E j)]$$

$$\chi^2_{Hkl,\alpha} = \qquad (6)$$

$$\sum_{(i,j) \in N_{kl,\alpha}} [\vec{z}_{ij} - (\vec{a}_{kl}^H + \vec{b}_{kl}^H i + \vec{c}_{kl}^H j)]^\dagger M_{ij}^H [\vec{z}_{ij} - (\vec{a}_{kl}^H + \vec{b}_{kl}^H i + \vec{c}_{kl}^H j)]$$

and the estimated code value of a target pixel positioned at (i,j) is:

$$\vec{z}_{ij}^{kl,\alpha} = \vec{a}_{kl}^H + \vec{b}_{kl}^H i + \vec{c}_{kl}^H j \qquad (7)$$

and the computed noise reduced code value of the target pixel at position (i,j) is:

$$\vec{z}_{ij}' = \frac{\sum_{kl,\alpha} \omega(\alpha, \chi^2_{Ekl,\alpha}) \vec{z}_{ij}^{kl,\alpha}}{\sum_{kl,\alpha} \omega(\alpha, \chi^2_{Ekl,\alpha})} \qquad (8)$$

where the sums are over all $kl,\alpha$ such that pixel $(i,j) \in N_{kl,\alpha}$ and where the weighting function is:

$$\omega(\alpha, \chi^2_{Ekl,\alpha}) = \frac{W_\alpha}{n_\alpha} e^{-\frac{\chi^2_{Ekl,\alpha}}{v_\alpha}} r_\alpha \qquad (9)$$

where $M_{ij}^E$ and $M_{ij}^H$ are arbitrary matrices chosen to optimize segmentation and smoothing, respectively.

5. The overlapping planar approximation method, according to claim 4, wherein the matrices $M_{ij}^E$ and $M_{ij}^H$ are defined as follows:

$$M_{ij}^E = (U_E^\dagger D_E U_E)^\dagger \Sigma_{ij}^{-1} (U_E^\dagger D_E U_E) \qquad (10)$$

$$M_{ij}^H = (U_H^\dagger D_H U_H)^\dagger \Sigma_{ij}^{-1} (U_H^\dagger D_H U_H) \qquad (11)$$

where $U_E$, $U_H$ are unitary matrices, $D_E$, $D_H$ are diagonal matrices, and $\Sigma_{ij}$ is the noise covariance matrix such that the unitary matrices provide rotation of the vector space axes and the diagonal matrices attach different weight to the different axes in the rotated vector spaces.

6. The overlapping planar approximation method, according to claim 4, wherein said goodness of fit ($X^2$) is used as a measure of edge detection, texture detection, and image segmentation.

7. The overlapping planar approximation, method, according to claim 5, with the unitary matrices chosen to rotate into a luminance/chrominance vector space, and the diagonal matrices chosen to assign greater weight to the luminance axis in the rotated spaces.

8. The overlapping planar approximation method, according to claim 5, wherein said goodness of fit ($X^2$) is used as a measure of edge detection, texture detection, and image segmentation.

9. The overlapping planar approximation method, according to claim 2, wherein the weighting function is selected to provide the desired result.

10. The overlapping planar approximation method, according to claim 2, wherein the selected neighborhood sizes of the target pixel are 21×21, 11×11, 5×5, 1×1, the empirical weights are:

$$W_{21 \times 21} = 64, W_{11 \times 11} = 16, W_{5 \times 5} = 16, W_{1 \times 1} = 1,$$

and the rolloff parameters are:

$$r_{21 \times 21} = r_{11 \times 11} = r_{5 \times 5} = r_{1 \times 1} = 1.$$

11. The overlapping planar approximation method, according to claim 1, wherein said goodness of fit ($X^2$) is used as a measure of edge detection, texture detection, and image segmentation.

12. The overlapping planar approximation method of claim 1 applied to multi-channel digital signals other than multi-band digital images.

13. A method of image smoothing and noise reduction by least squares fits, comprising the steps of:

(a) selecting a target pixel from a set of pixels representing a multi-band image of interest;

(b) selecting a neighborhood containing the target pixel;

(c) computing the least squares best fit plane for the selected neighborhood of step b; and (d) using the least squares fit estimated value of step c as the smoothed output value for the target pixel.

14. The method of image smoothing and noise reduction, according to claim 13, wherein two least squares fits are substituted in place of the least squares best fit of step c by the use of the following equations:

$$\chi^2_{Ekl,\alpha} = \qquad (5)$$

$$\sum_{(i,j) \in N_{kl,\alpha}} [\vec{z}_{ij} - (\vec{a}_{kl}^E + \vec{b}_{kl}^E i + \vec{c}_{kl}^E j)]^\dagger M_{ij}^E [\vec{z}_{ij} - (\vec{a}_{kl}^E + \vec{b}_{kl}^E i + \vec{c}_{kl}^E j)]$$

$$\chi^2_{Hkl,\alpha} = \qquad (6)$$

$$\sum_{(i,j) \in N_{kl,\alpha}} [\vec{z}_{ij} - (\vec{a}_{kl}^H + \vec{b}_{kl}^H i + \vec{c}_{kl}^H j)]^\dagger M_{ij}^H [\vec{z}_{ij} - (\vec{a}_{kl}^H + \vec{b}_{kl}^H i + \vec{c}_{kl}^H j)]$$

and the estimated code value of a target pixel positioned at (i,j) is:

$$\vec{z}_{ij}^{kl,\alpha} = \vec{a}_{kl}^H + \vec{b}_{kl}^H i + \vec{c}_{kl}^H j \qquad (7)$$

and the computed noise reduced code value of the target pixel at position (i,j) is:

$$\vec{z}_{ij}' = \frac{\sum_{kl,\alpha} \omega(\alpha, \chi^2_{Ekl,\alpha}) \vec{z}_{ij}^{kl,\alpha}}{\sum_{kl,\alpha} \omega(\alpha, \chi^2_{Ekl,\alpha})} \qquad (8)$$

where the sums are over all $kl,\alpha$ such that pixel $(i,j) \in N_{kl,\alpha}$ and where the weighting function is:

$$\omega(\alpha, \chi^2_{Ekl,\alpha}) = \frac{W_\alpha}{n_\alpha} e^{-\frac{\chi^2_{Ekl,\alpha}}{v_\alpha} r_\alpha} \quad (9)$$

where $M_{ij}^E$ and $M_{ij}^H$ are arbitrary matrices, chosen to optimize segmentation and smoothing, respectively.

15. The method of image smoothing and noise reduction, according to claim 14, wherein the matrices $M_{ij}^E$ and $M_{ij}^H$ are defined as follows:

$$M_{ij}^E = (U_E^\dagger D_E U_E)^\dagger \overset{-1}{\underset{ij}{\Sigma}} (U_E^\dagger D_E U_E) \quad (10)$$

$$M_{ij}^H = (U_H^\dagger D_H U_H)^\dagger \overset{-1}{\underset{ij}{\Sigma}} (U_H^\dagger D_H U_H) \quad (11)$$

where $U_E$, $U_H$ are unitary matrices, $D_E$, $D_H$ are diagonal matrices, and $\Sigma_{ij}$ is the noise covariance matrix such that the unitary matrices provide rotation of the vector space axes and the diagonal matrices attach different weight to the different axes in the rotated vector spaces.

16. A method of reducing noise introduced into a multi-band digital image in the course of transforming a multi-band photographic image into a multi-band digital image, said multi-band digital image being comprised of an array of pixels each having respective luminance and chrominance components, comprising the steps of:
   a. selecting a target pixel position from said array of pixels of which said digital image is comprised;
   b. prescribing a neighborhood of pixels about said target pixel position;
   c. for the neighborhood prescribed in step b, generating a signal representative of a goodness of fit ($X^2$) and estimated luminance and chrominance values of the image pixel at said target pixel position in accordance with a least squares best fit plane for said prescribed neighborhood;
   d. iterating steps b and c for respectively different types and respectively different positions of said prescribed neighborhood;
   e. generating an output image pixel for said target pixel position in accordance with summations of all estimated values of the respective luminance and chrominance components of the image pixel at said target pixel position with weights based upon said goodness of fit ($X^2$); and
   f. iterating steps a through e for all pixels of said array of pixels, so as to form an output pixel array of yielding a reduced noise digital image.

17. A method according to claim 16, wherein said goodness of fit ($X^2$) is a measure of edge detection, texture detection, and image segmentation.

18. A method according to claim 16, wherein said goodness of fit is defined as:

$$\chi^2_{kl,\alpha} = \quad (1)$$

$$\underset{(i,j)\in N_{kl,\alpha}}{\Sigma} [\vec{z}_{ij} - (\vec{a}_{kl} + \vec{b}_{kl}i + \vec{c}_{kl}j)]^\dagger \overset{-1}{\underset{ij}{\Sigma}} [\vec{z}_{ij} - (\vec{a}_{kl} + \vec{b}_{kl}i + \vec{c}_{kl}j)]$$

and the estimated code value vector of a target pixel positioned at (i,j) is:

$$\vec{z}_{ij}^{kl,\alpha} = \vec{a}_{kl} + \vec{b}_{kl}i + \vec{c}_{kl}j \quad (2)$$

and the computed noise reduced code value vector of the target pixel at position (i,j) is:

$$\vec{z}_{ij}' = \frac{\underset{kl,\alpha}{\Sigma} \omega(\alpha, \chi^2_{kl,\alpha}) \vec{z}_{ij}^{kl,\alpha}}{\underset{kl,\alpha}{\Sigma} \omega(\alpha, \chi^2_{kl,\alpha})} \quad (3)$$

where the sums are over all kl,$\alpha$ such that pixel (i,j)$\in N_{kl,\alpha}$ and where the weighting function is:

$$\omega(\alpha, \chi^2_{kl,\alpha}) = \frac{W_\alpha}{n_\alpha} e^{-\frac{\chi^2_{kl,\alpha}}{v_\alpha} r_\alpha} \quad (4)$$

wherein $N_{kl,\alpha}$ is a neighborhood of type $\alpha$ centered at pixel (k,l) $W_\alpha$ is an empirically chosen weight for each neighborhood type, $n_\alpha$ is the number of pixels in the neighborhood, $v_\alpha$ is the degrees of freedom for the lease squares fit, $r_\alpha$ is an empirically chosen rolloff parameter of order unity, $\vec{z}_{ij}$ is a code value vector (having one component per band of the multi-band image), $\Sigma_{ij}$ is the noise covariance matrix at pixel (i,j),$\chi^2_{kl,\alpha}$ is the goodness of fit for the linear least squares regression of a plane on neighborhood $N_{kl,\alpha}$, and $\vec{z}_{ij}^{kl,\alpha}$ is the estimate of the regression at pixel location (i,j), where pixel (i,j) is some pixel in the neighborhood $N_{kl,\alpha}$, and a,b,c are coefficients which minimize the goodness of fit.

19. A method according to claim 18, wherein said noise covariance matrix is diagonal to thereby partially decouple the equations for the various bands.

20. A method according to claim 18, wherein two least squares fits are substituted in place of the single least squares fit by replacing equations (1) through (4) with the following equations:

$$\chi^2_{Ekl,\alpha} = \quad (5)$$

$$\underset{(i,j)\in N_{kl,\alpha}}{\Sigma} [\vec{z}_{ij} - (\vec{a}_{kl}^E + \vec{b}_{kl}^E i + \vec{c}_{kl}^E j)]^\dagger M_{ij}^E [\vec{z}_{ij} - (\vec{a}_{kl}^E + \vec{b}_{kl}^E i + \vec{c}_{kl}^E j)]$$

$$\chi^2_{Hkl,\alpha} = \quad (6)$$

$$\underset{(i,j)\in N_{kl,\alpha}}{\Sigma} [\vec{z}_{ij} - (\vec{a}_{kl}^H + \vec{b}_{kl}^H i + \vec{c}_{kl}^H j)]^\dagger M_{ij}^H [\vec{z}_{ij} - (\vec{a}_{kl}^H + \vec{b}_{kl}^H i + \vec{c}_{kl}^H j)]$$

and the estimated code value of a target pixel positioned at (i,j) is:

$$\vec{z}_{ij}^{kl,\alpha} = \vec{a}_{kl}^H + \vec{b}_{kl}^H i + \vec{c}_{kl}^H j \quad (7)$$

and the computed noise reduced code value of the target pixel at position (i,j) is:

$$\vec{z}_{ij}' = \frac{\underset{kl,\alpha}{\Sigma} \omega(\alpha, \chi^2_{Ekl,\alpha}) \vec{z}_{ij}^{kl,\alpha}}{\underset{kl,\alpha}{\Sigma} \omega(\alpha, \chi^2_{Ekl,\alpha})} \quad (8)$$

where the sums are over all kl,$\alpha$ such that pixel (i,j)$\in N_{kl,\alpha}$, and where the weighting function is:

$$\omega(\alpha, \chi^2_{Ekl,\alpha}) = \frac{W_\alpha}{n_\alpha} e^{-\frac{\chi^2_{Ekl,\alpha}}{v_\alpha} r_\alpha} \quad (9)$$

where $M_{ij}^E$ and $M_{ij}^H$ are arbitrary matrices chosen to optimize segmentation and smoothing, respectively.

21. A method according to claim 20, wherein the matrices $M_{ij}^E$ and $M_{ij}^H$ are defined as follows:

$$M_{ij}^E = (U_E^\dagger D_E U_E)^\dagger \Sigma_{ij}^{-1} (U_E^\dagger D_E U_E) \quad (10)$$

$$M_{ij}^H = (U_H^\dagger D_H U_H)^\dagger \Sigma_{ij}^{-1} (U_H^\dagger D_H U_H) \quad (11)$$

where $U_E$, $U_H$ are unitary matrices, $D_E$, $D_H$ are diagonal matrices, and $\Sigma_{ij}$ is the noise covariance matrix such that the unitary matrices provide rotation of the vector space axes and the diagonal matrices attach different weight to the different axes in the rotated vector spaces.

22. A method according to claim 21, wherein said unitary matrices are operative to rotate into a luminance/chrominance vector space, and the diagonal matrices are operative to assign greater weight to the luminance axis in the rotated spaces.

23. A method according to claim 20, wherein said goodness of fit ($X^2$) is a measure of edge detection, texture detection, and image segmentation.

24. A method according to claim 21, wherein said goodness of fit ($X^2$) is a measure of edge detection, texture detection, and image segmentation.

25. A method of reducing noise that has been introduced into a multi-channel digital representation of a multi-channel analog physical manifestation in the course of transforming said multi-channel analog physical manifestation into a multi-channel digital representation thereof, said multi-channel digital representation being comprised of an array of elements each having a plurality of channel components, comprising the steps of:

a. selecting a target position from said array of elements of which said multi-band digital representation is comprised;
   b. prescribing a neighborhood of elements about said target position;
   c. for the neighborhood prescribed in step b, generating a signal representative of a goodness of fit ($X^2$) and estimated multi-channel values of the element at said target position in accordance with a least squares best fit plane for said prescribed neighborhood;
   d. iterating steps b and c for respectively different types and respectively different positions of said prescribed neighborhood;
   e. generating an output element for said target position in accordance with summations of all estimated values of the multi-channel components of said element at said target position with weights based upon said goodness of fit ($X^2$); and
   f. iterating steps a through e for all elements of said array, so as to form an output element array yielding a reduced noise digital representation of said analog manifestation.

26. A method of smoothing and reducing noise introduced into a multi-band digital image in the course of transforming a color photographic image into a multi-band digital image, said multi-band digital image being comprised of an array of pixels each having respective luminance and chrominance components, comprising the steps of:

a. selecting a target pixel position from said array of pixels of which said multi-band digital image is comprised;
   b. prescribing a neighborhood of pixels about said target pixel position;
   c. for the neighborhood prescribed in step b, generating a signal representative of the least squares best fit plane for said prescribed neighborhood; and
   d. generating respective luminance and chrominance components of multi-band image pixel for said target pixel position in accordance with the least squares best fit signal generated in step c.

27. A method according to claim 26, wherein two least squares fits are substituted in place of the least squares best fit of step c by the use of the following equations:

$$\chi^2_{Ekl,\alpha} = \sum_{(i,j)\in N_{kl,\alpha}} [\vec{z}_{ij} - (\vec{a}^E_{kl} + \vec{b}^E_{kl}i + \vec{c}^E_{kl}j)]^\dagger M^E_{ij} [\vec{z}_{ij} - (\vec{a}^E_{kl} + \vec{b}^E_{kl}i + \vec{c}^E_{kl}j)] \quad (5)$$

$$\chi^2_{Hkl,\alpha} = \sum_{(i,j)\in N_{kl,\alpha}} [\vec{z}_{ij} - (\vec{a}^H_{kl} + \vec{b}^H_{kl}i + \vec{c}^H_{kl}j)]^\dagger M^H_{ij} [\vec{z}_{ij} - (\vec{a}^H_{kl} + \vec{b}^H_{kl}i + \vec{c}^H_{kl}j)] \quad (6)$$

and the estimated code value of a target pixel positioned at (i,j) is:

$$\vec{z}_{ij}^{kl,\alpha} = \vec{a}^H_{kl} + \vec{b}^H_{kl}i + \vec{c}^H_{kl}j \quad (7)$$

and the computed noise reduced code value of the target pixel at position (i,j) is:

$$\vec{z}_{ij}' = \frac{\sum_{kl,\alpha} \omega(\alpha, \chi^2_{Ekl,\alpha}) \vec{z}^{kl,\alpha}_{ij}}{\sum_{kl,\alpha} \omega(\alpha, \chi^2_{Ekl,\alpha})} \quad (8)$$

where the sums are, where $N_{kl,\alpha}$ is a neighborhood of type $\alpha$ and where the weighting function is:

$$\omega(\alpha, \chi^2_{Ekl,\alpha}) = \frac{W_\alpha}{n_\alpha} e^{-\frac{\chi^2_{Ekl,\alpha}}{\nu_\alpha}} r_\alpha \quad (9)$$

where $M^E_{ij}$ and $M^H_{ij}$ are arbitrary matrices, chosen to optimize segmentation and smoothing, respectively and a, b and c are coefficients which minimize the goodness of fit.

28. A method according to claim 27, wherein the matrices $M^E_{ij}$ and $M^H_{ij}$ are defined as follows:

$$M^E_{ij} = (U_E^\dagger D_E U_E)^\dagger \Sigma_{ij}^{-1} (U_E^\dagger D_E U_E) \quad (10)$$

$$M^H_{ij} = (U_H^\dagger D_H U_H)^\dagger \Sigma_{ij}^{-1} (U_H^\dagger D_H U_H) \quad (11)$$

where $U_E$, $U_H$ are unitary matrices, $D_E$, $D_H$ are diagonal matrices, and $\Sigma_{ij}$ is the noise covariance matrix such that the unitary matrices provide rotation of the vector space axes and the diagonal matrices attach different weight to the different axes in the rotated vector spaces.

29. A method of operating a multi-color image processing system, in which a multi-color photographic image is digitized by a multi-band digitizing image transducer, said multi-band digitizing image transducer producing multi-band digital imagery signals representative of a multi-band digital image composed of an array of multi-band image picture elements, said multi-color image processing system producing, from said multi-band digital imagery data, a multi-color output image from which noise artifacts that have been introduced into said multi-band digital image in the course of the digitization of said multi-color photographic image are reduced, so as not to be discernible to the human eye, comprising the steps of:

a. selecting a target picture element position from said array of multi-band image picture elements of which said multi-band digital image is comprised;
   b. prescribing a neighborhood of picture elements about said target pixel position;
   c. for the neighborhood prescribed in step b, generating a signal representative of a goodness of fit ($X^2$) and an estimated value of the image picture element at said target picture element position in accordance with a least squares best fit plane for said prescribed neighborhood;

d. iterating steps b and c for respectively different types and respectively different positions of said prescribed neighborhood;

e. generating an output image picture element for said target picture element position in accordance with summations of all estimated values of the respective luminance and chrominance components at said target picture element position with weights based upon said goodness of fit ($X^2$);

f. iterating steps a through e for all picture elements of said array, so as to produce output image signals associated with an output picture element array yielding a reduced noise digital image; and g. applying the output image signals produced in step f to an image reproduction device, which produces a multi-color output image in which said noise artifacts have been reduced so as not to be discernible to the human eye.

* * * * *